(No Model.)
J. W. SHONE.
FOLDING MUD GUARD FOR BICYCLES.
No. 509,771. Patented Nov. 28, 1893.
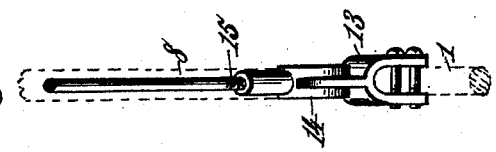
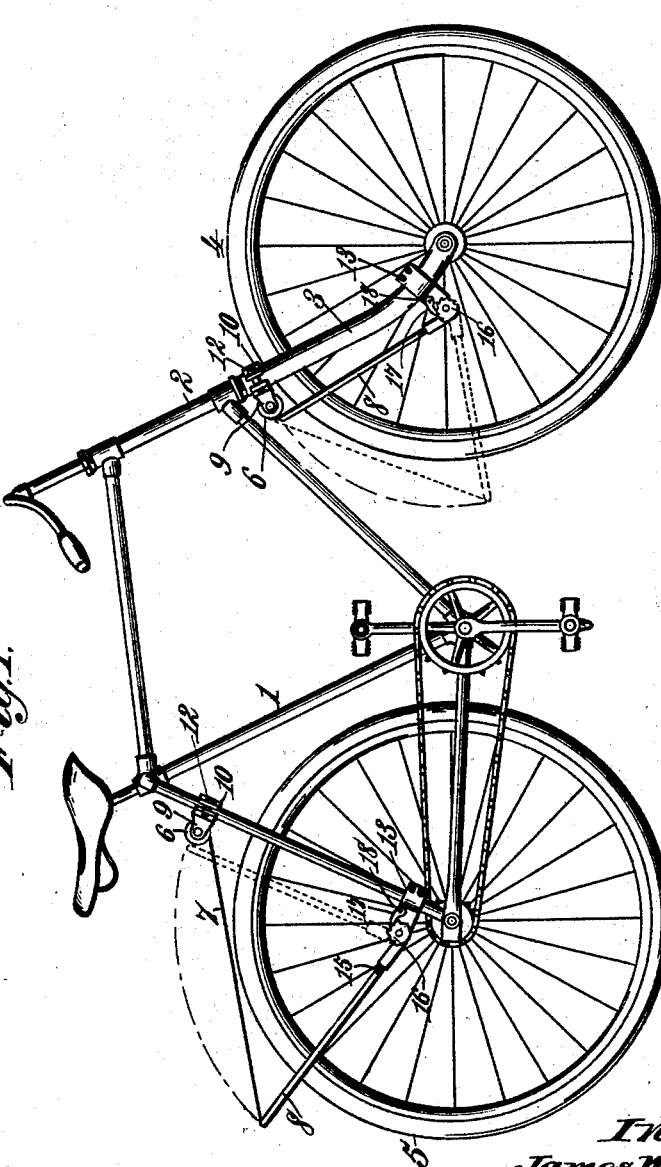
Witnesses.
Inventor:
James W. Shone.
By James L. Norris,
Atty.

UNITED STATES PATENT OFFICE.

JAMES WALTER SHONE, OF ROCHESTER, NEW YORK.

FOLDING MUD-GUARD FOR BICYCLES.

SPECIFICATION forming part of Letters Patent No. 509,771, dated November 28, 1893.

Application filed June 26, 1893. Serial No. 478,849. (No model.)

*To all whom it may concern:*

Be it known that I, JAMES WALTER SHONE, a citizen of the United States, residing at Rochester, in the county of Monroe and State of New York, have invented new and useful Improvements in Folding Mud-Guards for Bicycles, &c., of which the following is a specification.

This invention relates to that type of devices or appliances which are employed on bicycles and other wheeled vehicles for protecting the rider from mud and the like thrown up by the revolution of the wheels.

The invention has for its object to provide a new and improved mud guard which can be quickly and conveniently folded or rolled and unfolded or unrolled, and automatically locked in operative position.

To accomplish this object my invention consists in the features of construction and the combination or arrangement of devices hereinafter described and claimed, reference being made to the accompanying drawings, in which—

Figure 1 is a side elevation of a bicycle having my invention applied to the front and rear wheels, and Fig. 2 is a detail rear elevation, showing a portion of the bicycle frame and the mud guard attachment mounted thereupon.

In order to enable those skilled in the art to make and use my invention, I will now describe the same in detail, referring to the drawings, wherein—

The numeral 1 indicates the frame of a bicycle, 2 the steering post having the fork 3, as usual, 4 the front wheel, and 5 the rear wheel, all of which parts may be of any known or desired construction, and are not more fully explained as they may be variously modified, according to the character of the vehicle.

I have explained my invention as applied to a bicycle, but, obviously, it may be employed in connection with any form of velocipede or wheeled vehicle designed to be propelled by a rider or riders.

The mud guard attachment is composed of a spring roller 6 similar to an ordinary spring curtain roller, and a strip 7 of any suitable flexible material which is connected at one end with the spring roller, and at the opposite end with a swinging arm or frame 8 pivotally connected with a part of the vehicle or velocipede. The strip of flexible material may be of any desired width, and the spring roller 6 is journaled in bearings 9 forming part of an adjustable clamp 10, adapted to be clamped to the frame 1, or to the steering post 2 through the medium of a screw 12.

In the drawings I have illustrated a mud guard arranged in operative relation to each wheel; but inasmuch as a detail description of one of the attachments is sufficient I will specifically describe that which is arranged in relation to the rear wheel 5. The clamp 10 is designed to be attached to any bicycle now in use, and for this purpose the clamp is composed of sections which span the bifurcated part of the frame, as will be understood by reference to Fig. 2. The lower end of the frame 1, in proximity to the journal of the rear wheel, is provided with a clamp 13, on which is pivotally mounted the head 14 of the arm or frame 8 in such manner that by swinging this arm on its pivotal attachment the mud guard strip is rolled or unrolled according as the strip is to be folded compactly out of the way, or unfolded to extend over the periphery of the wheel to protect the rider from mud and the like thrown or splashed up by such wheel. The arm or frame 8 is preferably connected with the head 14 by a screw-thread 15, and the head is provided with a ratchet 16 arranged in the arc of a circle and adapted to be engaged by a pawl 17, pivoted, as at 18, to the clamp 2, so that when the arm or frame 8 is swung outward or away from the frame 1 to unroll or extend the mud guard strip 7, the arm or frame 8 is automatically locked by the pawl engaging one of the teeth of the ratchet 16. When it is desired to fold or roll up the mud guard strip, the pawl 17 is released from the ratchet 16 and the spring roller 6 will instantly wind the flexible strip 7, and thus place the mud guard attachment in a very compact form, so that it is practically out of the way when not required for use. The pivoted swinging arm or frame 8 not only serves to extend the flexible mud guard strip 7, but supports the latter when extended in proper relation to the periphery of the wheel, so that a rider is protected from mud and the like thrown or splashed up by the revolution of the wheel.

By providing the clamps 10 and 2 for supporting the spring roller and the swinging arm or frame, it is possible to apply the mud guard attachment to any bicycle now in use, which is a very desirable feature of my invention.

The provision of the pivoted swinging arm connected with the flexible mud guard strip for unrolling and supporting the latter renders it possible to entirely dispense with a rigid frame located above the wheel for sustaining a flexible strip, as has been heretofore proposed; and, furthermore, by providing the spring roller and the pivoted swinging arm or frame, the mud guard attachment can be compactly folded when desired, so that it offers no obstruction when not in actual use.

I prefer to employ the ratchet and pawl for automatically locking the arm or frame 8 to hold the mud guard strip when extended, but other locking devices may be employed, and therefore I do not confine myself to the specific locking devices illustrated.

Where the mud guard attachment is applied to the steering post and fork of a bicycle, as exhibited in the drawings, the mud guard attachment will follow all lateral movements of the wheel in steering the bicycle, and therefore protect the legs of the rider from mud and the like thrown up by the revolution of the wheel.

While I have illustrated a mud guard attachment constructed according to my invention and applied in operative relation to each wheel of the bicycle, I do not wish it to be understood that I confine myself to using the attachments in connection with both wheels.

Having thus described my invention, what I claim is—

1. The combination with a bicycle or other wheeled vehicle, of an extensible mud guard strip, a swinging arm or frame connected with the strip and pivoted to a part of the vehicle for extending the strip by the swinging movement of the arm or frame, and automatically engaging devices for automatically locking and holding the arm or frame when swung to extend the strip, substantially as described.

2. The combination with a bicycle or other wheeled vehicle, of an extensible mud guard strip, a swinging arm or frame connected with the strip and pivotally mounted on a part of the vehicle frame for extending the strip by the swinging movement of the arm or frame, a ratchet on the said arm or frame, and a pawl for engaging the ratchet to hold the arm or frame when it is swung to extend the strip, substantially as described.

3. A mud guard attachment for bicycles and other wheeled vehicles, consisting of a roller, a flexible strip adapted to roll on and unroll from the roller, a pivoted swinging arm or frame connected with the strip for extending the latter when said arm or frame is swung on its pivotal attachment, and a pawl and ratchet located at the pivoted end of the arm or frame for automatically locking the latter when swung to unroll the strip, substantially as described.

4. A mud guard attachment for a bicycle or other wheeled vehicle, consisting of a clamp carrying a roller, another clamp carrying a pawl and a pivoted swinging arm or frame having a ratchet with which the pawl engages, and a flexible mud guard strip connected at one end with the roller and at the other end with the arm or frame, so that the latter serves to extend and support the strip when swung on its pivotal attachment, substantially as described.

In testimony whereof I have hereunto set my hand in presence of two subscribing witnesses.

JAMES WALTER SHONE.

Witnesses:
WM. H. FARRAND,
WM. C. LOWREY.